United States Patent
Nanda et al.

(10) Patent No.: US 11,610,024 B2
(45) Date of Patent: Mar. 21, 2023

(54) SYSTEMS AND METHODS FOR PROTECTING SEARCH PRIVACY

(71) Applicant: NORTONLIFELOCK INC., Tempe, AZ (US)

(72) Inventors: Susanta Nanda, San Jose, CA (US); Kevin Roundy, El Segundo, CA (US); Ashwin Kayyoor, San Jose, CA (US)

(73) Assignee: Gen Digital Inc., Tempe, AZ (US)

( * ) Notice: Subject to any disclaimer, the term of this patent is extended or adjusted under 35 U.S.C. 154(b) by 346 days.

(21) Appl. No.: 16/836,732

(22) Filed: Mar. 31, 2020

(65) Prior Publication Data

US 2021/0303731 A1  Sep. 30, 2021

(51) Int. Cl.
| | |
|---|---|
| G06F 21/00 | (2013.01) |
| G06F 21/62 | (2013.01) |
| G06F 16/9032 | (2019.01) |
| G06F 16/9535 | (2019.01) |

(52) U.S. Cl.
CPC .... *G06F 21/6263* (2013.01); *G06F 16/90328* (2019.01); *G06F 16/9535* (2019.01); *G06F 21/6227* (2013.01)

(58) Field of Classification Search
CPC .............. G06F 21/6263; G06F 16/9535; G06F 21/6227; G06F 21/6245; G06F 16/953; G06F 16/90328
See application file for complete search history.

(56) References Cited

U.S. PATENT DOCUMENTS

| | | | |
|---|---|---|---|
| 2005/0283468 A1* | 12/2005 | Kamvar | .............. G06F 16/3325 |
| 2007/0239682 A1* | 10/2007 | Arellanes | .............. G06F 16/951 |
| 2009/0112805 A1* | 4/2009 | Garbow | ................ G06F 16/903 |

* cited by examiner

*Primary Examiner* — Yogesh Paliwal
(74) *Attorney, Agent, or Firm* — Greenberg Traurig, LLP

(57) ABSTRACT

The disclosed computer-implemented method for protecting search privacy may include (i) receiving, via a search interface, a search query comprising at least one search term, (ii) determining a sensitivity level of the search query based on the at least one search term, (iii) directing the search query to a search engine that has a level of privacy correlated with the sensitivity level of the search query, and (iv) returning, via the search interface, at least one result of directing the search query to the search engine that has the level of privacy correlated with the sensitivity level of the search query. Various other methods, systems, and computer-readable media are also disclosed.

20 Claims, 7 Drawing Sheets

SYSTEMS AND METHODS FOR PROTECTING SEARCH PRIVACY

BACKGROUND

Search engines are powerful tools that enable users to find relevant websites. Many search engines store user data, such as search history, to personalize search results. Some search engines may also use user data to target advertisements or build user profiles to sell to advertisers or other third parties. In some cases, users may prefer not to have this data collected. For example, a user searching for sensitive medical information may prefer data about the search not be collected and potentially made available to health insurance companies, who may increase the user's premium or deny the user insurance based on inferences about the medical information. Similarly, a user searching for other types of sensitive content may prefer not to receive targeted ads related to the content.

Unfortunately, many search engines do not present users with the option to avoid having data collected or shared. Some workarounds exist, such as searching via a private browsing session, but search engines may use other data about the user's device to correlate the searches made in the private browsing session with previous searches. While some search engines do offer privacy settings, these search engines may not be as effective at returning results for all queries as other, less private search engines. The present disclosure, therefore, identifies and addresses a need for systems and methods for protecting search privacy.

SUMMARY

As will be described in greater detail below, the instant disclosure generally relates to systems and methods for protecting search privacy by directing sensitive queries to search engines with high levels of privacy and less sensitive queries to search engines with high levels of effectiveness.

In one example, a computer-implemented method for protecting search privacy may include (i) receiving, via a search interface, a search query including at least one search term, (ii) determining a sensitivity level of the search query based on the at least one search term, (iii) directing the search query to a search engine that has a level of privacy correlated with the sensitivity level of the search query, and (iv) returning, via the search interface, at least one result of directing the search query to the search engine that has the level of privacy correlated with the sensitivity level of the search query.

In one embodiment, the search interface may include a plug-in for a web browser. Additionally or alternatively, the search interface may include a web page for display in a web browser. In some examples, receiving the search query may include (i) receiving a partial search query including at least one character, (ii) directing the partial search query to a search engine with a high level of privacy, (iii) receiving at least one auto-complete result from directing the partial search query to the search engine with the high level of privacy, and (iv) constructing the search query based at least in part on the at least one auto-complete result from directing the partial search query to the search engine with the high level of privacy.

In some examples, determining the sensitivity level of the search query based on the at least one search term may include determining a category of the at least one search term and identifying the sensitivity level correlated with the category. In one embodiment, the computer-implemented method may further include (i) enabling a user to set a custom sensitivity level for the category, (ii) determining that an additional search term is associated with the category, and (iii) identifying the custom sensitivity level correlated with the category.

In some examples, directing the search query to the search engine may include identifying a user search profile correlated with the category and directing the query to the search engine via the user search profile. In some embodiments, determining the sensitivity level of the search query based on the at least one search term may include analyzing the search term via a text classification algorithm.

In one embodiment, a system for implementing the above-described method may include at least one physical processor and physical memory comprising computer-executable instructions that, when executed by the physical processor, cause the physical processor to (i) receive, via a search interface, a search query including at least one search term, (ii) determine a sensitivity level of the search query based on the at least one search term, (iii) direct the search query to a search engine that has a level of privacy correlated with the sensitivity level of the search query, and (iv) return, via the search interface, at least one result of directing the search query to the search engine that has the level of privacy correlated with the sensitivity level of the search query.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, via a search interface, a search query including at least one search term, (ii) determine a sensitivity level of the search query based on the at least one search term, (iii) direct the search query to a search engine that has a level of privacy correlated with the sensitivity level of the search query, and (iv) return, via the search interface, at least one result of directing the search query to the search engine that has the level of privacy correlated with the sensitivity level of the search query.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
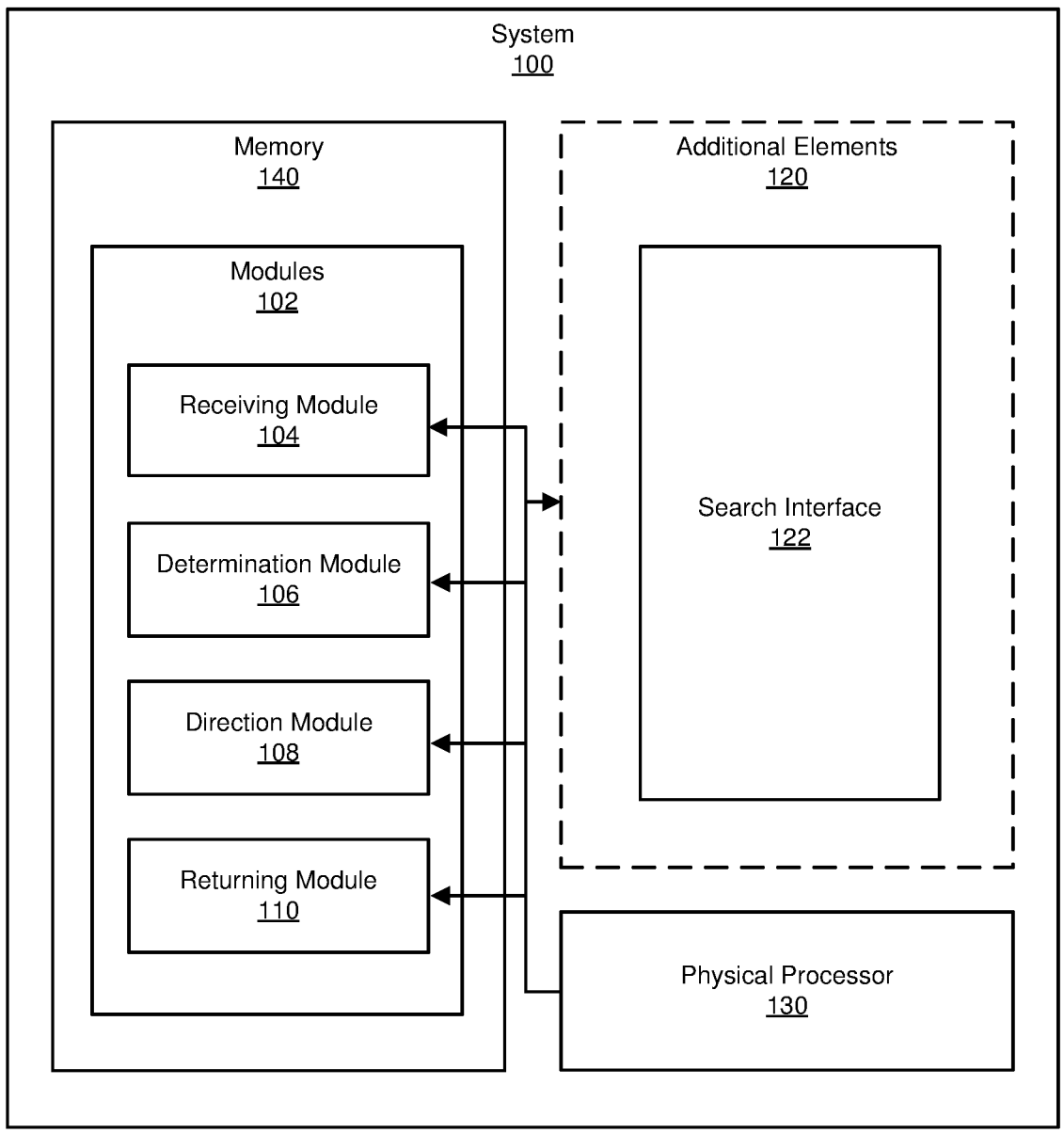
FIG. 1 is a block diagram of an example system for protecting search privacy.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting search privacy. As will be explained in greater detail below, by selecting a search engine based on the sensitivity level of the search query, the systems and methods described herein may provide a user with high-quality search data without compromising the user's data privacy. By directing non-sensitive queries to search engines with poor privacy settings that provide high-quality search results and sensitive queries to search engines with stronger privacy protections, the systems described herein may help a user maintain balance between privacy and search result quality without requiring extra effort on the part of the user. In addition, the systems and methods described herein may improve the functioning of a computing device by improving the ability of the computing device to return search results to a user. These systems and methods may also improve the field of data privacy by improving the ability of users to receive high-quality search results while maintaining data privacy.

Figure 2:
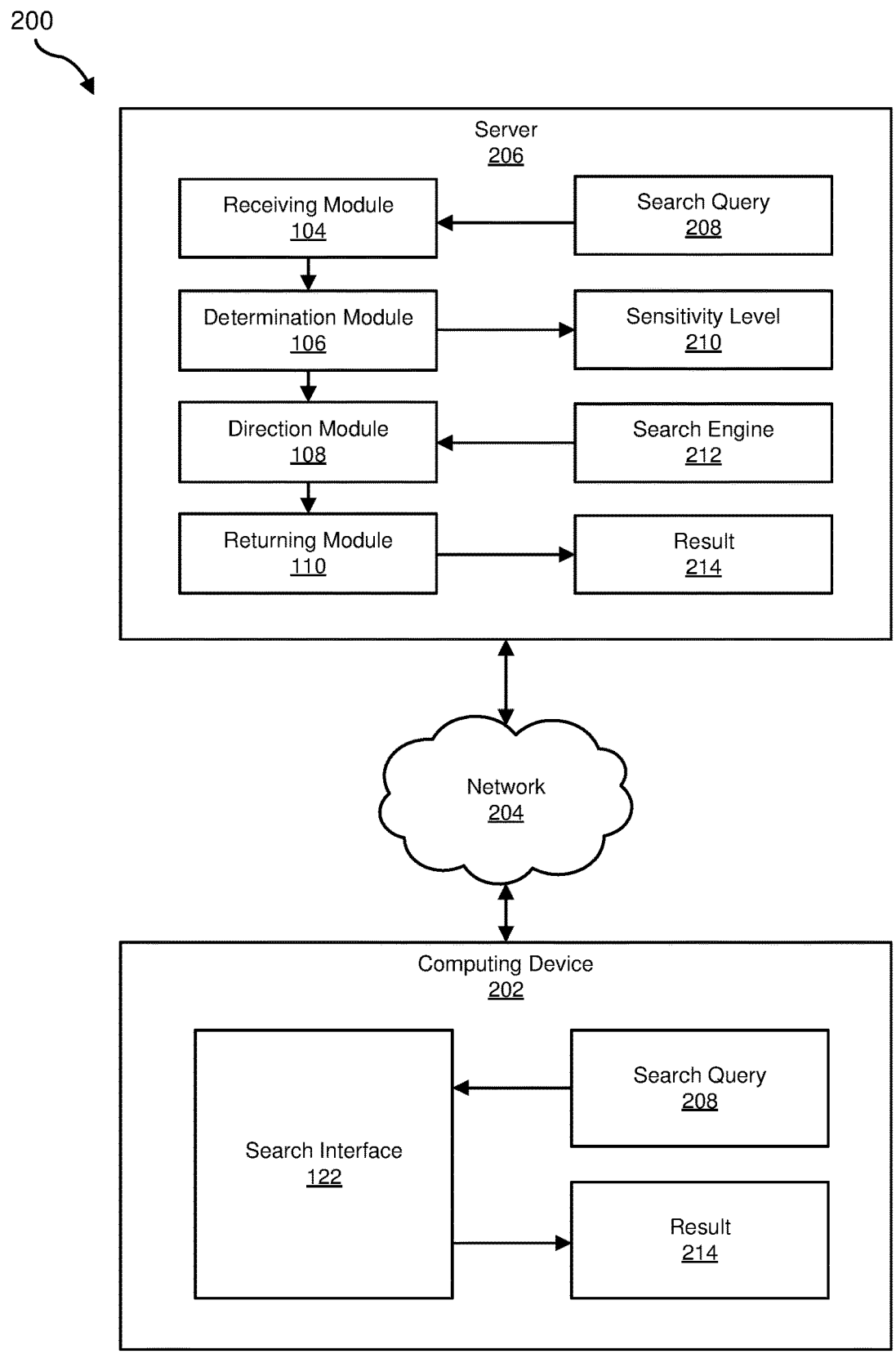
FIG. 2 is a block diagram of an additional example system for protecting search privacy.
Figure 4:
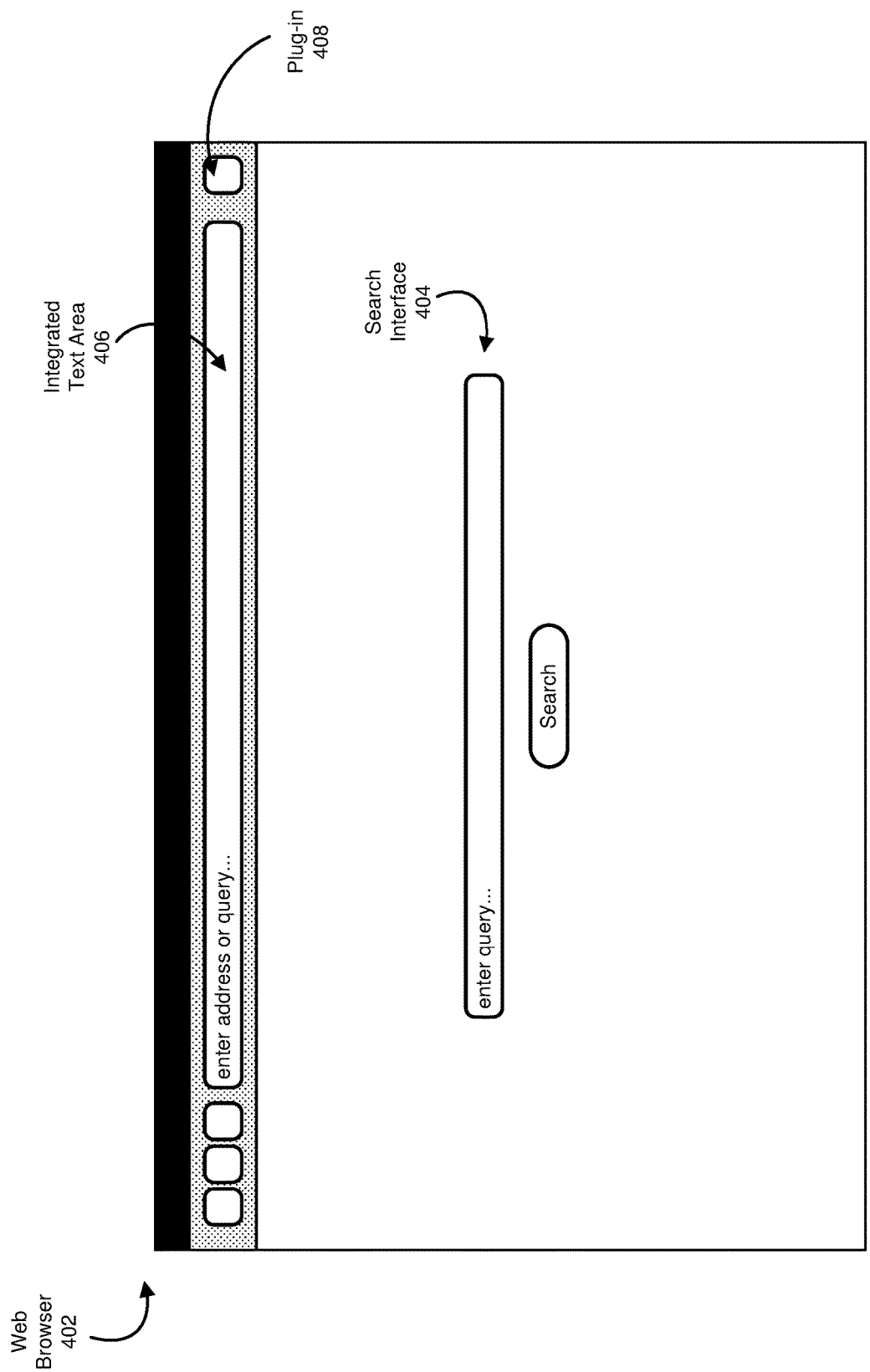
FIG. 4 is an illustration of an example user interface for protecting search privacy.
Figure 5:
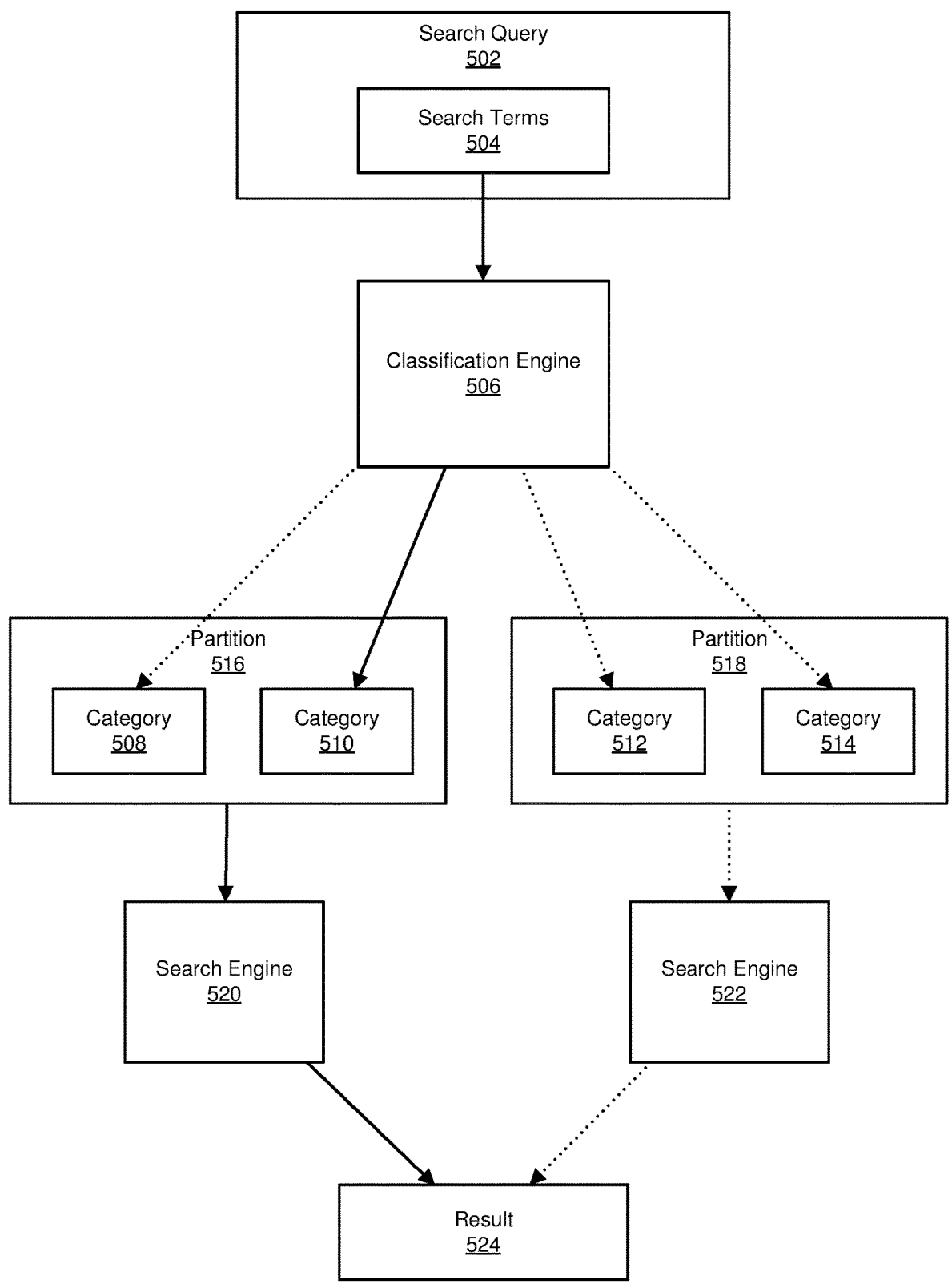
FIG. 5 is a block diagram of an example computing system for protecting search privacy.

The following will provide, with reference to FIGS. 1, 2, and 5, detailed descriptions of example systems for protecting search privacy. Detailed descriptions of corresponding computer-implemented methods will also be provided in connection with FIG. 3. Detailed descriptions of example user interfaces for protecting search privacy will be provided in connection with FIG. 4. In addition, detailed descriptions of an example computing system and network architecture capable of implementing one or more of the embodiments described herein will be provided in connection with FIGS. 6 and 7, respectively.

FIG. 1 is a block diagram of example system 100 for protecting search privacy. As illustrated in this figure, example system 100 may include one or more modules 102 for performing one or more tasks. For example, and as will be explained in greater detail below, example system 100 may include a receiving module 104 that receives, via a search interface, a search query that includes at least one search term. Example system 100 may additionally include a determination module 106 that determines a sensitivity level of the search query based on the at least one search term. Example system 100 may also include a direction module 108 that directs the search query to a search engine that has a level of privacy correlated with the sensitivity level of the search query. Example system 100 may additionally include a returning module 110 that returns, via the search interface, at least one result of directing the search query to the search engine that has the level of privacy correlated with the sensitivity level of the search query. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting search privacy. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as search interface 122. Search interface 122 generally represents any type or form of interface capable of receiving text input from a user. In one example, search interface 122 may be an integrated text area in a web browser window. Additionally or alternatively, search interface 122 may include an input area and/or form on a web page. In some embodiments, search interface 122 may direct user input to one or more search engines.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to protect search privacy. For example, and as will be described in greater detail below, receiving module 104 may receive, via a search interface 122, a search query 208 that includes at least one search term. Next, determination module 106 may determine a sensitivity level 210 of search query 208 based on the at least one search term. Direction module 108 may direct search query 208 to a search engine 212 that has a level of privacy correlated with sensitivity level 210 of search query 208. After receiving results from search engine 212, returning module 110 may return, via search interface 122, at least one result 214 of directing search query 208 to search engine 212 that has the level of privacy correlated with sensitivity level 210 of search query 208.

Computing device 202 generally represents any type or form of computing device capable of reading computer-executable instructions. In some embodiments, computing device 202 may be an end user device. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of analyzing text data. In some embodiments, server 206 may be a server specifically configured to process private data. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another. Although illustrated on server 206, in some embodiments, some or all of modules 102 may be hosted on computing device 202.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
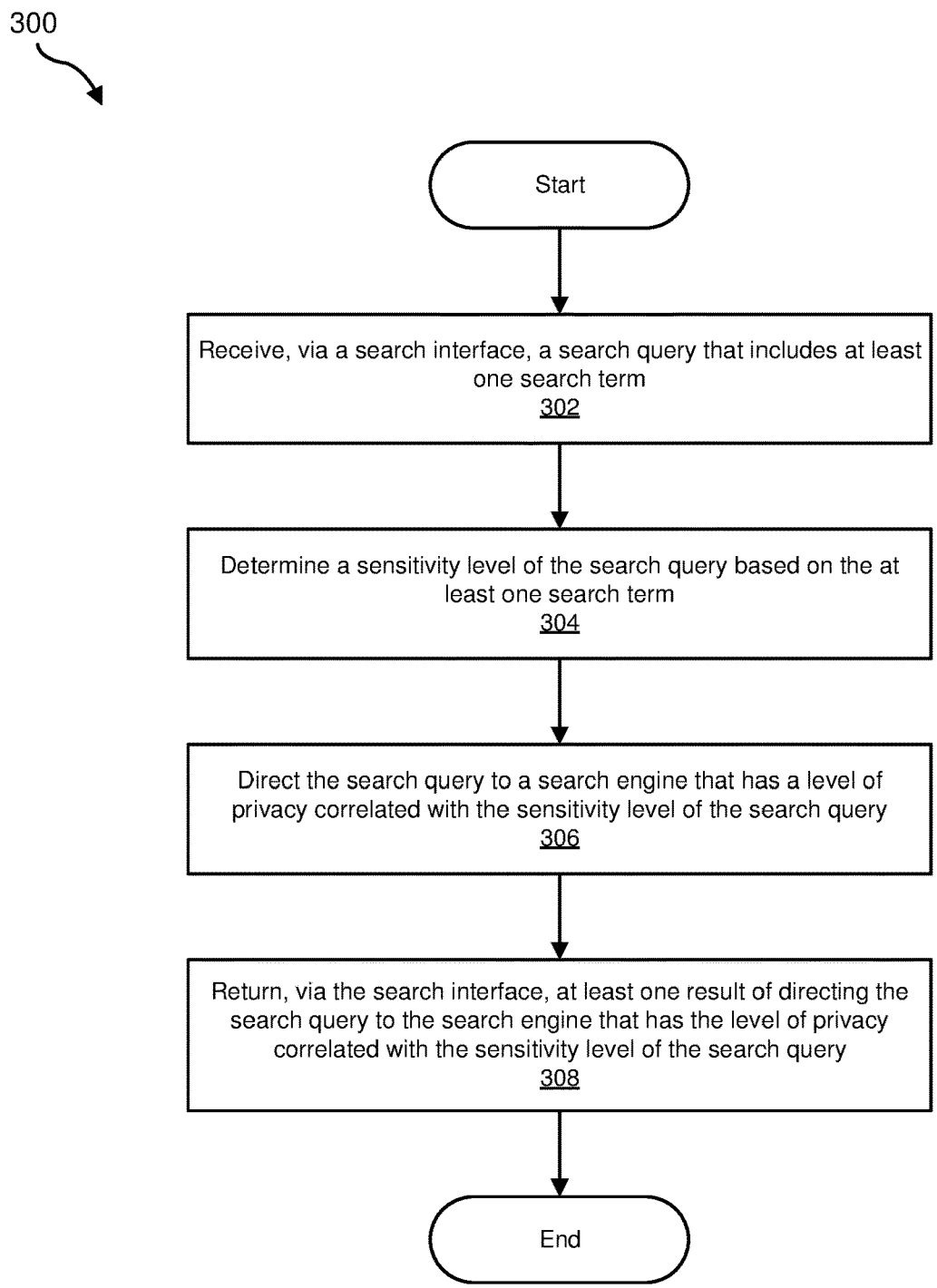
FIG. 3 is a flow diagram of an example method for protecting search privacy.

FIG. 3 is a flow diagram of an example computer-implemented method 300 for protecting search privacy. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive, via a search interface, a search query including at least one search term. For example, receiving module 104 may, as part of computing device 202 in FIG. 2, receive, via search interface 122, search query 208 including at least one search term.

The term "search query," as used herein, generally refers to a string of text input and/or input in any format that can be parsed into a string of text (e.g., audio input). In some examples, a search query may include only alphanumeric characters. In other examples, a search query may include punctuation and/or other special characters. In one example, a search query may include one or more words in a human-readable language. Additionally or alternatively, a search query may include special operators and/or formatting to be parsed by a search engine. In some examples, a search query may include one or more search terms.

The term "search term," as used herein, generally refers to a string of characters. In one embodiment, a search term may be a string of adjacent non-whitespace characters. Additionally or alternatively, a search term may include multiple strings separated by whitespace but joined by punctuation or other formatting, such as a phrase within quotation marks. In some examples, a search term may include a word in a human-readable language. In some examples, a search term may also include formatting to be parsed by a search engine, such as "site:".

Receiving module 104 may receive the search query in a variety of ways and/or contexts. For example, receiving module 104 may receive the search query as a string of text entered into a web browser or other application. Additionally or alternatively, receiving module 104 may receive the search query as audio input received by a microphone. For example, a user may verbally ask a smart home hub, "What is a software patent?" and receiving module 104 may parse the audio input to obtain the search query "software patent."

In some embodiments, receiving module 104 may be part of a plug-in for a web browser. For example, as illustrated in FIG. 4, a web browser 402 may be configured with a plug-in 408 that directs searches entered into an integrated text area 406 to the systems described herein (as opposed to directing the searches to a default search engine associated with web browser 402). In some embodiments, integrated text area 406 may parse text input such that uniform resource locators (URLs) cause browser 402 to load the web page associated with the URL while non-URL strings of text are redirected by plug-in 408 to be parsed as search queries.

Additionally or alternatively, receiving module 104 may receive the search query via a web page. For example, receiving module 104 may include a search interface 404 in the form of a web page with a textarea, input, and/or other form element that is configured to receive text input from a user.

In some examples, receiving module 104 may receive the search query by (i) receiving a partial search query that includes at least one character, (ii) directing the partial search query to a search engine with a high level of privacy, (iii) receiving at least one auto-complete result from directing the partial search query to the search engine with the high level of privacy, and (iv) constructing the search query based at least in part on the at least one auto-complete result from directing the partial search query to the search engine with the high level of privacy. For example, receiving module 104 may receive the first word of a search query, send that word to a search engine with a high-level of privacy, and display one or more auto-complete results suggested by the search engine for that word to the user (e.g., as a dropdown list). If the user selects one of the auto-complete results, the systems described herein may receive the auto-complete result as the search query. In some examples, receiving module 104 may send a partial word and/or more than one word to the search engine with the high level of privacy in order to receive auto-complete results. For example, receiving module 104 may receive the partial search query "is a malicious toaster," send the partial search query to a search engine, and display the auto-complete result "is a malicious toaster a threat to my home automation network" to the user as a potential search query. By sending all partial search queries to a search engine with a high level of privacy, the systems described herein may preserve a user's privacy in the event that the full search query is sensitive.

Returning to FIG. 3, at step 304, one or more of the systems described herein may determine a sensitivity level of the search query based on the at least one search term. For example, determination module 106 may, as part of computing device 202 in FIG. 2, determine sensitivity level 210 of search query 208 based on the at least one search term.

The term "sensitivity level," as used herein, generally refers to any categorization of the subject matter and/or terms within a search query relative to user expectations of privacy. In some embodiments, the systems described herein may categorize a search query in a binary fashion as sensitive or not sensitive. Additionally or alternatively, the systems described herein may have multiple categories of sensitivity level. For example, the systems described herein may categorize medical information and financial information as sensitive but may categorize medical information at a higher level of sensitivity than financial information.

Determination module 106 may determine the sensitivity level of the search query in a variety of ways. For example, determination module 106 may analyze each term in the search query independently. Additionally or alternatively, determination module 106 may analyze the search query as a whole.

In some embodiments, determination module 106 may determine the sensitivity level of the search query based on the at least one search term by determining a category of the at least one search term and identifying the sensitivity level correlated with the category. For example, determination module 106 may categorize the search term as financial, health, business, entertainment, politics, education, sports, legal, news, shopping, work, and/or any other suitable subject matter. In one embodiment, one or more categories may include sub-categories, such as "political news" and/or "weather" as sub-categories of "news." In some embodiments, the systems described herein may assign a default sensitivity level to each category and/or sub-category, such as assigning a high level of sensitivity to health, a medium level of sensitivity to politics, and/or a low level of sensitivity to sports. In one embodiment, systems described herein may enable a user to set custom sensitivity levels for each category and/or sub-category. For example, the category of "shopping" may be marked as non-sensitive by default and the systems described herein may receive input from a user indicating that "shopping" should be treated as sensitive. If the systems described herein categorize a future search query as related to "shopping," the systems described herein may treat the search query as sensitive.

In some embodiments, the systems described herein may group categories into partitions that are each associated with a search engine. For example, as illustrated in FIG. 5, the systems described herein may receive a search query 502 that includes one or more search terms 504. In one embodiment, the systems described herein may include a classification engine 506 that classifies search terms 504 and/or search query 502 as belonging to a category 510. In some examples, classification engine 506 may instead classify search terms 504 and/or search query 502 as belonging category 508, 512, or 514. Classification engine 506 may generally represent any algorithm, heuristic, and/or model capable of classifying text as belonging to one or more categories. In some embodiments, classification engine 506 may include a multinomial logistic regression implementation. In one embodiment, categories 508 and/or 510 may fall under a partition 516 while categories 512 and/or 514 may fall under a partition 518. In some embodiments, partitions may represent broad classifications, such as "private" versus "public," "work" versus "personal," and/or "sensitive" versus "non-sensitive." In one embodiment, each partition may be associated with a search engine. For example, partition 516 may include categories with a high sensitivity level and may be associated with a high-privacy search engine 520 while partition 518 may include categories with a low sensitivity level and may be associated with a low-privacy but high-effectiveness search engine 522. In some examples, the systems described herein may direct search query 502 to the relevant search engine and receive result 524.

Returning to FIG. 3, at step 306, one or more of the systems described herein may direct the search query to a search engine that has a level of privacy correlated with the sensitivity level of the search query. For example, direction module 108 may, as part of computing device 202 in FIG. 2, direct search query 208 to search engine 212 that has a level of privacy correlated with sensitivity level 210 of search query 208.

The term "level of privacy," as used herein, generally refers to a categorization of a search engine's policies in terms of storing and/or sharing user data. In some examples, a search engine's level of privacy may be correlated with the level of control a user has over how data about the user is stored and/or shared. For example, a search engine that provides a user with no ability to set preferences for how data is stored or handled and has no policy against sharing user data with third parties may have a low level of privacy. In another example, a search engine that enables a user to choose which data is stored, delete stored data, and/or set other preferences in relation to how user data is stored and/or shared may have a high level of privacy. In one example, a search engine that does not store or share user data may have a high level of privacy.

Direction module 108 may direct the search query to the search engine that has the level of privacy correlated with the sensitivity level of the search query in a variety of ways. For example, direction module 108 may send the search query to the search engine via an application programming interface (API).

In some embodiments, the systems described herein may further preserve user privacy by creating separate user profiles for different categories. For example, the systems described herein may store multiple sets of authentication information and/or tracking information, such as browser cookies, credentials, tokens, and/or other stored information for each search engine. In some examples, direction module 108 may direct the search query to the search engine by identifying a user search profile correlated with the category and directing the query to the search engine via the user search profile. By splitting up user searches across multiple profiles, the systems described herein may prevent a search engine from correlating, for example, financial queries with medical queries, and thereby building a more complete picture of user behavior for ad targeting and/or other purposes. In some embodiments, the systems described herein may create separate user profiles correlated with search characteristics other than subject matter, such as the human-readable language of the search terms (e.g., German, English, Spanish, etc.), the geolocation from which the search query is entered (e.g., at home versus in the office), and/or any other suitable category. In some embodiments, the systems described herein may create multiple unauthenticated sessions for a user on the same search engine and/or different search engines.

At step 308, one or more of the systems described herein may return, via the search interface, at least one result of directing the search query to the search engine that has the level of privacy correlated with the sensitivity level of the search query. For example, returning module 110 may, as part of computing device 202 in FIG. 2, return, via search interface 122, at least one result 214 of directing search query 208 to search engine 212 that has the level of privacy correlated with sensitivity level 210 of search query 208.

Returning module 110 may return the search results in a variety of ways. For example, returning module 110 may display the search results in the search interface. In another example, returning module 110 may redirect a web browser to a page on the search engine web site that displays the search results. Additionally or alternatively, returning module 110 may send one or more search results to another application. For example, if a user queries the systems described herein verbally via a smart home hub, the systems described herein may provide the top search result to the smart home hub to relay to the user via audio.

As explained above in connection with method 300 in FIG. 3, the systems and methods described herein may improve user search privacy without sacrificing search quality by automatically directing sensitive queries to search engines with higher privacy levels and non-sensitive queries to search engines with potentially higher-quality results but lower privacy levels. In some embodiments, the systems described herein may broaden the use of high-privacy search engines to any query for which the high-privacy search engine produces acceptable results (e.g., compared to results produced by a low-privacy search engine). Additionally or alternatively, the systems described herein may direct only sensitive queries to high-privacy search engines. In some embodiments, the systems described herein may categorize queries into multiple levels of sensitivity directed to multiple (e.g., three or four) search engines each with a different level of privacy. By automatically directing queries to the most effective search engine for the level of privacy necessary for the query, the systems described herein may improve user privacy and search experience.

Figure 6:
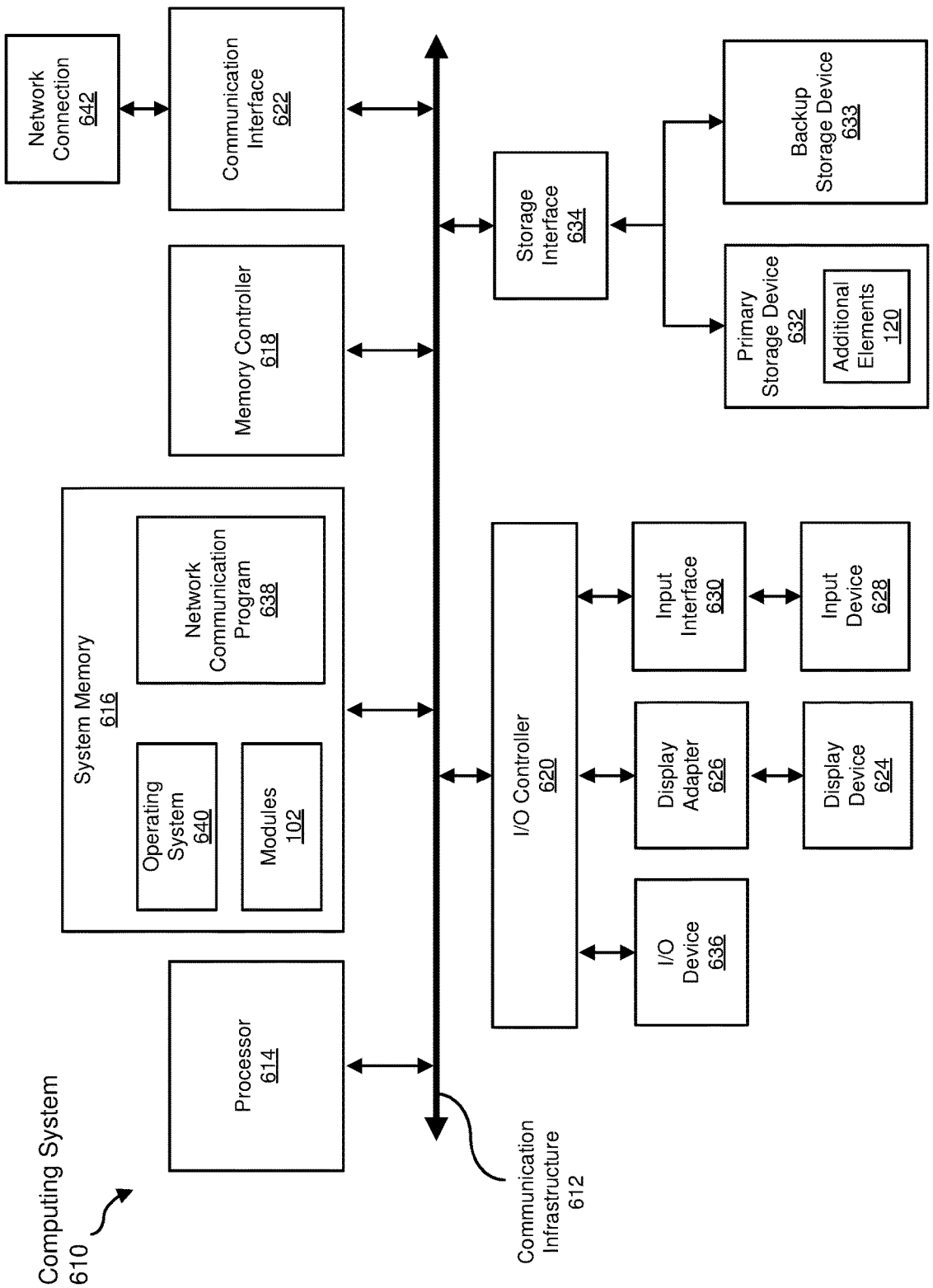
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120, such as search interface 122, from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
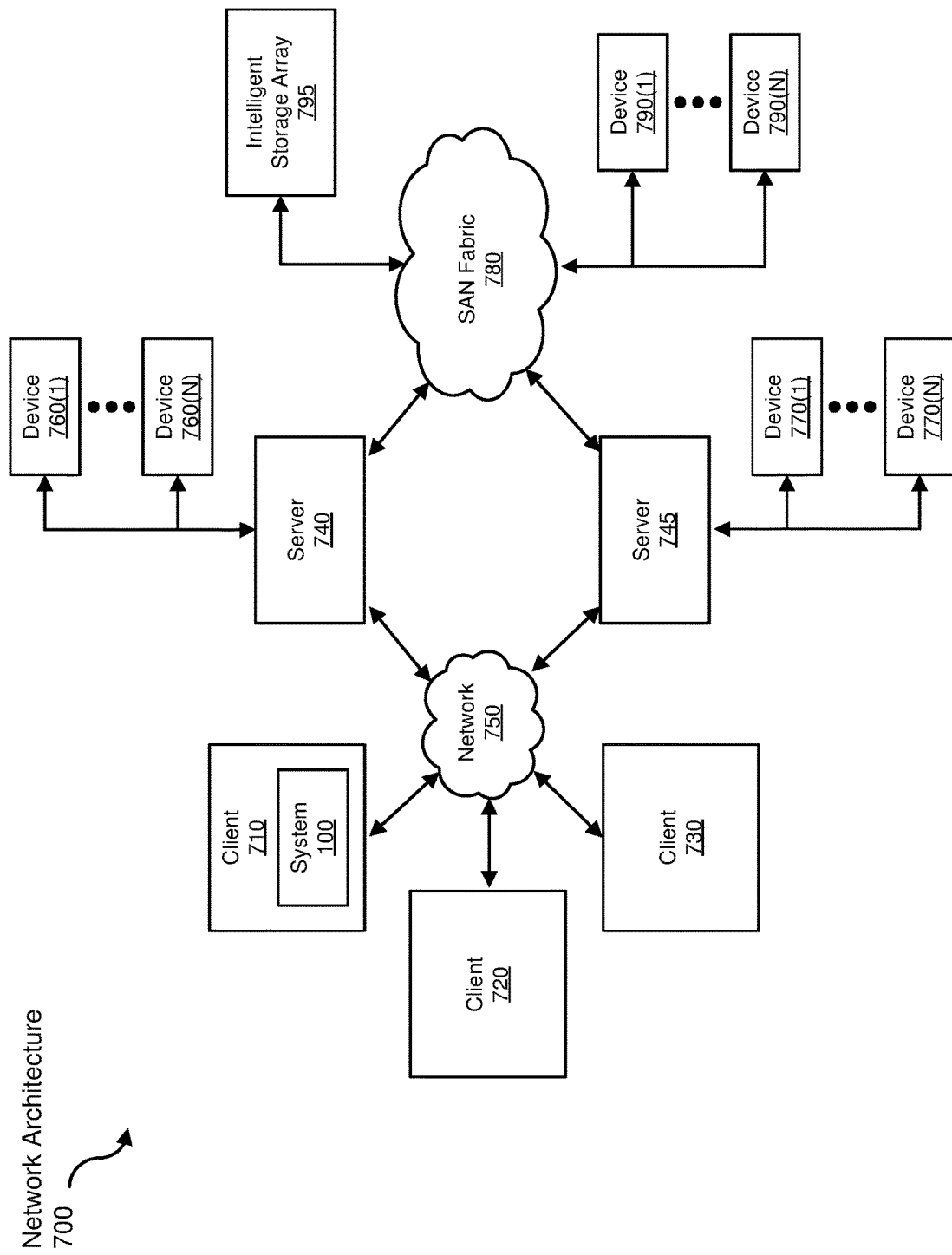
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for protecting search privacy.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive text data to be transformed, transform the text data by parsing the text data for search terms, output a result of the transformation to a text analysis and/or categorization algorithm, use the result of the transformation to determine a sensitivity level of the search query, and store the result of the transformation to train a classifier. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting search privacy, at least a portion of the method being performed by a computing device comprising at least one processor, the method comprising:
   receiving, via a search interface, a search query comprising at least one search term;
   determining a sensitivity level of the search query based on the at least one search term;
   selecting, from a plurality of available search engines, a search engine that has a level of privacy correlated with the sensitivity level of the search query;
   directing the search query to the search engine that has the level of privacy correlated with the sensitivity level of the search query; and
   returning, via the search interface, at least one result of directing the search query to the search engine that has the level of privacy correlated with the sensitivity level of the search query.

2. The computer-implemented method of claim 1, wherein the search interface comprises a plug-in for a web browser.

3. The computer-implemented method of claim 1, wherein the search interface comprises a web page for display in a web browser.

4. The computer-implemented method of claim 1, wherein receiving the search query comprises:
   receiving a partial search query comprising at least one character;
   directing the partial search query to a search engine with a high level of privacy;
   receiving at least one auto-complete result from directing the partial search query to the search engine with the high level of privacy; and
   constructing the search query based at least in part on the at least one auto-complete result from directing the partial search query to the search engine with the high level of privacy.

5. The computer-implemented method of claim 1, wherein determining the sensitivity level of the search query based on the at least one search term comprises:
   determining a category of the at least one search term; and
   identifying the sensitivity level correlated with the category.

6. The computer-implemented method of claim 5, further comprising:
   enabling a user to set a custom sensitivity level for the category;
   determining that an additional search term is associated with the category; and
   identifying the custom sensitivity level correlated with the category.

7. The computer-implemented method of claim 5, wherein directing the search query to the search engine comprises:
   identifying a user search profile correlated with the category; and
   directing the search query to the search engine via the user search profile.

8. The computer-implemented method of claim 1, wherein determining the sensitivity level of the search query based on the at least one search term comprises analyzing the at least one search term via a text classification algorithm.

9. A system for protecting search privacy, the system comprising:
   at least one physical processor;
   physical memory comprising computer-executable instructions that, when executed by the physical processor, cause the physical processor to:
      receive, via a search interface, a search query comprising at least one search term;
      determine a sensitivity level of the search query based on the at least one search term;
      select, from a plurality of available search engines, a search engine that has a level of privacy correlated with the sensitivity level of the search query;
      direct the search query to the search engine that has the level of privacy correlated with the sensitivity level of the search query; and
      return, via the search interface, at least one result of directing the search query to the search engine that has the level of privacy correlated with the sensitivity level of the search query.

10. The system of claim 9, wherein the search interface comprises a plug-in for a web browser.

11. The system of claim 9, wherein the search interface comprises a web page for display in a web browser.

12. The system of claim 9, wherein receiving the search query comprises:
   receiving a partial search query comprising at least one character;
   directing the partial search query to a search engine with a high level of privacy;
   receiving at least one auto-complete result from directing the partial search query to the search engine with the high level of privacy; and
   constructing the search query based at least in part on the at least one auto-complete result from directing the partial search query to the search engine with the high level of privacy.

13. The system of claim 9, wherein determining the sensitivity level of the search query based on the at least one search term comprises:
   determining a category of the at least one search term; and
   identifying the sensitivity level correlated with the category.

14. The system of claim 13, further comprising:
   enabling a user to set a custom sensitivity level for the category;
   determining that an additional search term is associated with the category; and
   identifying the custom sensitivity level correlated with the category.

15. The system of claim 13, wherein directing the search query to the search engine comprises:

identifying a user search profile correlated with the category; and directing the search query to the search engine via the user search profile.

16. The system of claim 9, wherein determining the sensitivity level of the search query based on the at least one search term comprises analyzing the at least one search term via a text classification algorithm.

17. A non-transitory computer-readable medium comprising one or more computer-readable instructions that, when executed by at least one processor of a computing device, cause the computing device to:

receive, via a search interface, a search query comprising at least one search term;

determine a sensitivity level of the search query based on the at least one search term;

selecting, from a plurality of available search engines, a search engine that has a level of privacy correlated with the sensitivity level of the search query;

direct the search query to the search engine that has the level of privacy correlated with the sensitivity level of the search query; and return, via the search interface, at least one result of directing the search query to the search engine that has the level of privacy correlated with the sensitivity level of the search query.

18. The non-transitory computer-readable medium of claim 17, wherein the search interface comprises a plug-in for a web browser.

19. The non-transitory computer-readable medium of claim 17, wherein the search interface comprises a web page for display in a web browser.

20. The non-transitory computer-readable medium of claim 17, wherein the one or more computer-readable instructions cause the computing device to receive the search query by:

receiving a partial search query comprising at least one character;

directing the partial search query to a search engine with a high level of privacy;

receiving at least one auto-complete result from directing the partial search query to the search engine with the high level of privacy; and constructing the search query based at least in part on the at least one auto-complete result from directing the partial search query to the search engine with the high level of privacy.

* * * * *